July 14, 1942.  F. W. BROOKE  2,290,030
ELECTRODE HOLDER
Filed March 1, 1941  2 Sheets-Sheet 1

INVENTOR
Frank W. Brooke

July 14, 1942.  F. W. BROOKE  2,290,030
ELECTRODE HOLDER
Filed March 1, 1941   2 Sheets-Sheet 2

INVENTOR
Frank W. Brooke

Patented July 14, 1942

2,290,030

UNITED STATES PATENT OFFICE 2,290,030

ELECTRODE HOLDER

Frank W. Brooke, Pittsburgh, Pa., assignor to Swindell-Dressler Corporation, Pittsburgh, Pa., a corporation of Pennsylvania Application March 1, 1941, Serial No. 381,278

12 Claims. (Cl. 13—16)

This invention relates to electrode holders. While the invention in certain of its aspects is of general application it is primarily adapted and intended for use in connection with holders for holding electrodes in electric furnaces.

Electrodes used in electric furnaces may be a foot or more in diameter and several feet long so are quite heavy and cumbersome and must be positively and effectively held during furnace operation. This has previously been undertaken by using holders of various types, some of which employ wedges driven into the holder body member directly against the electrode. This provision is highly unsatisfactory, particularly when graphite electrodes are employed, since it tends to rapidly deteriorate the electrode. The driving of the wedge tends to cause the metal of the wedge to flow so that the face of the wedge next the electrode becomes curved longitudinally of the electrode with the result that the wedge engages the electrode only at the top and bottom of the wedge, thereby subjecting the electrode to high localized stresses which often result in breaking the electrode. Moreover, there is danger of striking the electrode itself with the sledge hammer when tightening or loosening the wedge. Various provisions employing screws and the like have been proposed for obviating these disadvantages but no fully satisfactory and at the same time sufficiently low cost electrode holder has heretofore been provided.

I have solved the problem of avoiding damage to the electrode when tightening and loosening the grip of the holder upon it and have at the same time produced an electrode holder which is simple in construction and economical to manufacture and which obtains other important advantages in use. I preferably interpose between the electrode and the wedge a shoe which directly engages the electrode so that the wedge is driven in between the shoe and the holder body member. The body member is designed to receive the shoe. Means are provided for retaining the shoe against substantial movement relatively to the body member longitudinally of the electrode. The shoe preferably has an outward projection having an opening through which the wedge is adapted to pass whereby loosening of the wedge may be accomplished by prying, a crowbar engaging the wedge and engaging the outward projection of the shoe as a fulcrum. When the wedge is loosened or removed the shoe is adapted to be retracted away from the electrode and means are provided for holding the shoe temporarily in retracted position. An improved form of wedge is provided which has two parallel rows of teeth extending longitudinally of the wedge with the teeth in one row staggered relatively to those in the other row whereby to facilitate prying out of the wedge. Thus not only does the wedge itself not come in contact with the electrode but provision is made for facilitating application and removal of the wedge and for improving the operating characteristics of the holder as a whole.

A disadvantage of electrode holders employing a wedge driven into the holder body member directly against the electrode resides in the fact that an upward thrust against the bottom of the electrode tends to loosen the wedge, lowering the electrical efficiency of the contact and permitting subsequent spontaneous slipping of the electrode in the holder. Such upward thrust occurs frequently during the operation of electric furnaces using electrodes held in electrode holders. In my improved electrode holder provision has been made to insure that upward thrust on the electrode will not loosen the wedge. Hence good electrical contact is always maintained between the electrode and its holder and spontaneous slipping of the electrode in the holder is positively prevented.

A great many electric furnaces using vertical electrodes clamped in electrode holders are used in the industry for the manufacture of stainless and other alloy steels. In steels of this nature the carbon content must be carefully controlled and even must be held to very low limits. The unintentional introduction of carbon into the molten steel bath is, consequently, highly detrimental to the production of the desired product and may result in making the steel quite unsuited for its intended use. Since the electrodes used with furnaces of this type almost invariably consist of graphite or amorphous carbon the breaking or spontaneous slipping of electrodes held in electrode holders has introduced large amounts of undesired carbon into the molten steel. In fact, accidental immersion of the electrode in the molten steel is the factor primarily responsible for the frequently encountered so-called "carbon pick-up." My improved electrode holder eliminates spontaneous slipping of the electrode and greatly decreases electrode breakage, thereby to a large extent doing away with the undesired introduction of carbon into the metal.

Other details, objects and advantages of the invention will become apparent as the following description of a present preferred embodiment thereof proceeds.

In the accompanying drawings I have shown a present preferred embodiment of the invention, in which Figure 1 is a plan view of an electrode holder showing an electrode held therein;

Figure 1:
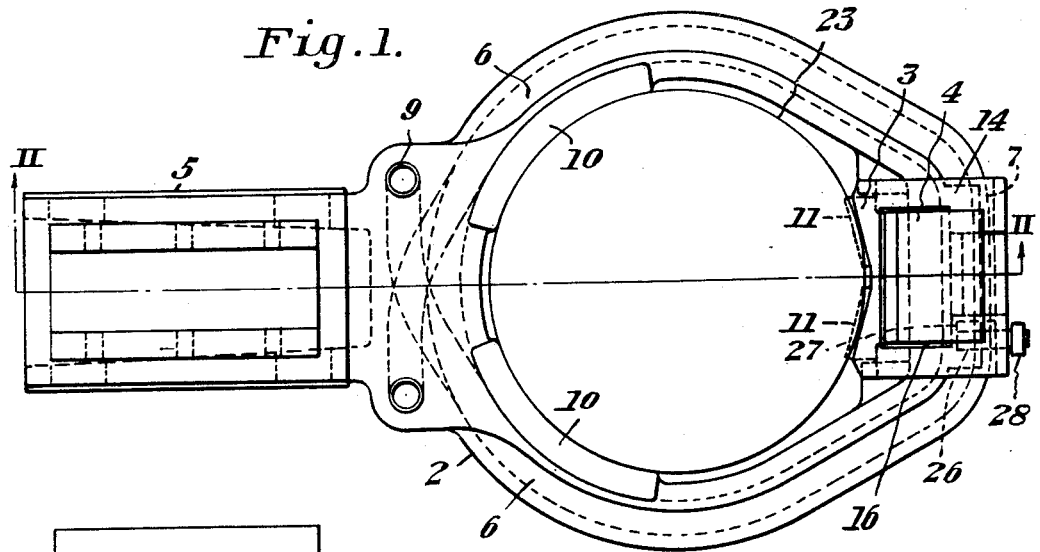

Referring now more particularly to the drawings, there is shown an electrode holder comprising a holder body member 2, a shoe 3 and a clamping member or wedge 4. The body member 2 is adapted to extend more than half way around the electrode so as to enable gripping of the electrode between a portion of the body member and the shoe, and in the form shown the body member completely surrounds the electrode. It is carried by an arm 5 whereby the holder and the electrode held thereby are moved to advance or retract the electrode axially in operation. The means for operating the electrode arm may be of any well known type.

As shown, the body member 2 is of generally pear shape when viewed axially, having a generally semicircular portion 6 and a complementary portion 7 having an internal recess 8. The body member may be water-cooled, a water-cooling duct 9 for this purpose being shown. Within the portion 6 of the body member are a pair of symmetrically arranged bearing portions 10 adapted to bear directly against the electrode and whose inner surfaces are curved to the same radius as the surface of the electrode. The shoe 3 is adapted to bear against the electrode opposite the bearing portions 10 and to be largely disposed within the body member 2. The shoe has complementary electrode engaging face portions 11 symmetrically arranged with respect to the major transverse axis of the body member 2 as are the bearing portions 10. The face portions 11 are serrated as shown at 12 to enable them to grip a graphite electrode, which is inclined to be somewhat slippery.

The face portions 11 extend vertically of the shoe 3, being carried by the shoe body portion 13 to which is connected, preferably unitarily, at its upper end a transversely extending flange-like portion 14 adapted when the shoe is applied to the body member 2 to project outwardly away from the electrode centrally of the portion 7 of the body member. The portion 14 of the shoe is adapted to overlie the body member whereby to limit downward movement of the shoe relatively to the body member and the shoe also has adjacent its bottom complementary projections 15 which when the shoe is applied to the body member 2 underlie portions 15a of the body member to prevent the shoe from moving upwardly therein. Consequently when the parts are operatively assembled the shoe is restrained against substantial axial movement within the body member.

Figure 2:
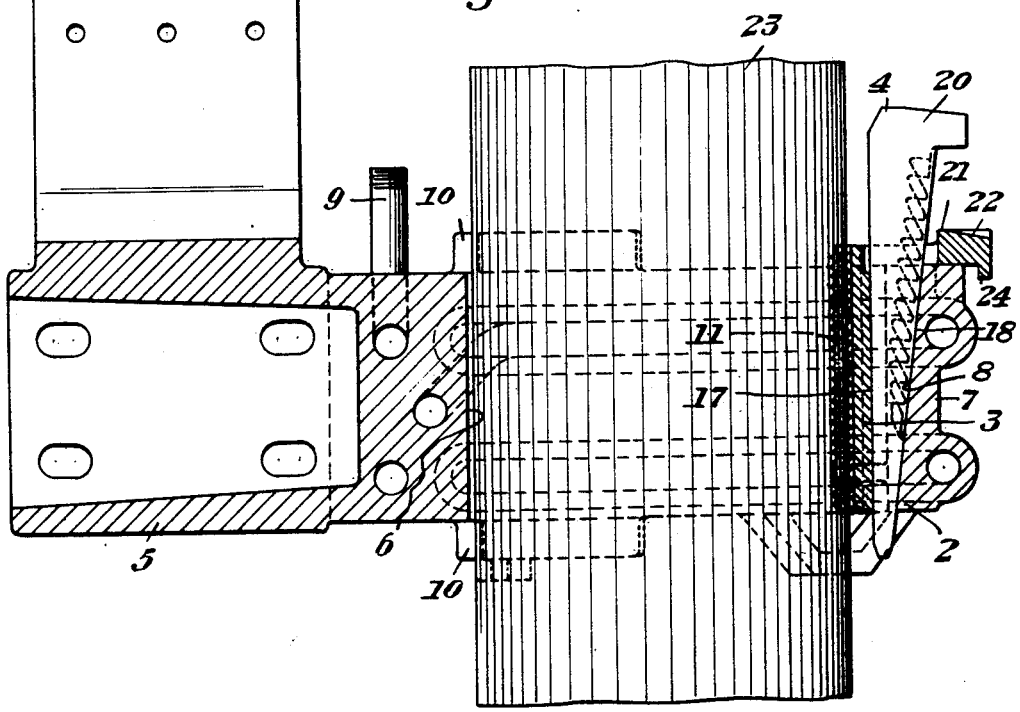
Figure 2 is a central vertical cross-sectional view taken on the line II—II of Figure 1.
Figure 7:
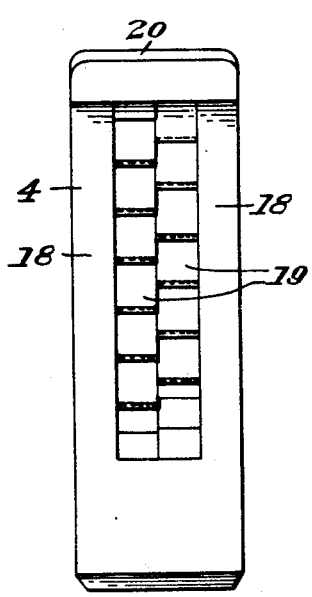
Figure 7 is a face view of the wedge.
Figure 8:
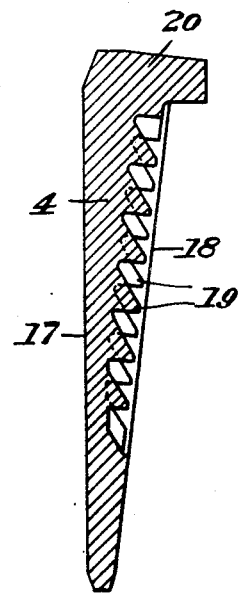
Figure 8 is a longitudinal cross-sectional view through the wedge.

The portion 14 of the shoe has therethrough an opening 16 which passes through the portion 14 in a direction substantially parallel to the axis of the electrode and into which the wedge 4 is adapted to extend. The wedge has a substantially smooth face 17 and another face 18 which intersects the face 17 at the point of the wedge, the face 18 having two parallel rows of teeth 19 as shown in Figures 2, 7 and 8, which rows extend longitudinally of the wedge with the teeth in one row staggered relatively to those in the other row. The wedge has an enlarged head 20 to facilitate driving it into place to tighten the grip of the holder upon the electrode.

Figure 3:
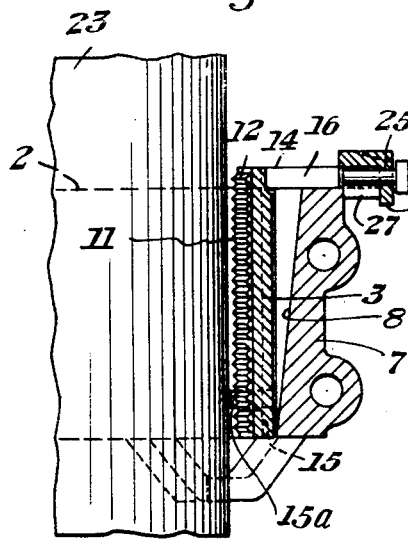
Figure 3 is a fragmentary vertical cross-sectional view through a portion of the structure shown in Figure 1 but with the wedge removed and the shoe retracted and held in retracted position.
Figure 4:
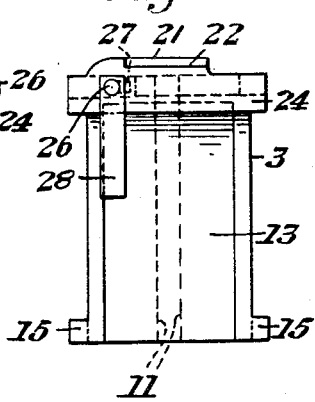
Figure 4 is an elevational view of the shoe.
Figure 5:
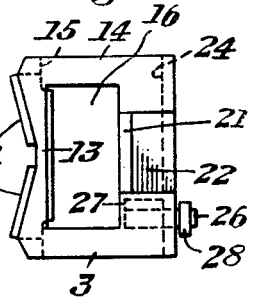
Figure 5 is a top plan view of the shoe.
Figure 6:
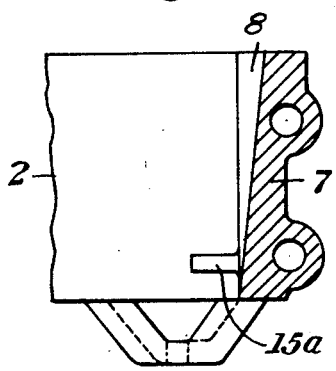
Figure 6 is a fragmentary central vertical cross-sectional view of the holder body member.

The grip of the holder upon the electrode is loosened by employing a crowbar or other prying tool and inserting the point thereof beneath one of the teeth 19 and laying the tool across the portion 21 of the shoe bordering upon the opening 16 therein. As shown in Figure 5, the portion 21 serves as a fulcrum for the prying tool. The material of the shoe portion 14 outside the portion 21 is outwardly and downwardly tapered as shown at 22 to facilitate the prying operation to loosen the wedge. The teeth 19 are concealed within the face 18 of the wedge so that the portion of the face 18 lying in the outer plane of such face is smooth so that the wedge may easily be driven into place through the opening 16 to transmit pressure between the shoe and the body member 2 and hold the electrode tightly in the holder. In Figures 1, 2 and 3 an electrode 23 is shown as being held by the holder.

One of the body member 2 and shoe 3 is provided with latch means for temporarily holding the shoe in retracted position when the wedge is loosened or removed. As shown, such latch means is applied to the portion 14 of the shoe. Such portion has a downwardly extending outer flange 24 having a bore 25 within which is positioned a pin 26 to which is welded a stop or latch member 27. At its outer end a handle or operating portion 28 is welded to the pin 26. When the wedge is loosened or removed the shoe may be retracted away from the electrode, the portion 14 moving outwardly and laterally over top the body member 2, and when the inner edge of the latch member 27 passes the outer edge of the body member the handle 28 may be turned to bring the member 27 down into engagement with the outer face of the body member 2 at its upper edge, thereby temporarily holding the shoe in retracted position away from the electrode. This facilitates adjusting the electrode relatively to the holder, which must be done from time to time as the electrode becomes shorter due to eroding away in use.

Thus I provide an extremely convenient and effective electrode holder which firmly holds the electrode without danger of damage thereto as occurred with the prior holders and which due to the construction and arrangement of the parts is especially useful and at the same time of low cost.

While I have shown and described a present preferred embodiment of the invention it is to be distinctly understood that the invention is not limited thereto but may be otherwise variously embodied within the scope of the following claims.

I claim:

1. An electrode holder comprising a body member adapted to extend more than half way around an electrode and to contact the electrode at a portion of its periphery and a plurality of cooperating clamping members adapted to be disposed within the body member at another portion of the periphery of the electrode, one of said clamping members being adapted to engage the electrode and another thereof to engage the first mentioned clamping member and transmit clamping pressure between the body member and the first mentioned clamping member.

2. An electrode holder comprising a body member having a surface portion inclined toward the axis of an electrode adapted to be held by the holder, a shoe adapted to lie against the electrode and to be supported by the body member and a clamping member adapted to be interposed between said surface portion of the body member and the shoe.

3. An electrode holder comprising a body member having a surface portion extending generally parallel to the axis of an electrode adapted to be held by the holder and another surface portion inclined toward such axis, said first mentioned surface portion being adapted to contact the electrode, a shoe adapted to lie against the electrode and a clamping member adapted to be interposed between said second mentioned surface portion of the body member and the shoe.

4. An electrode holder comprising a body member, a shoe adapted to be disposed between the body member and the electrode to be held therein and clamping means adapted to be disposed between the body member and shoe at one side only of the electrode.

5. An electrode holder comprising a body member having an internal recess, a shoe adapted to be disposed within the body member opposite said recess and lying against an electrode to be held by the holder and means adapted to enter said recess to transmit pressure between the body and shoe.

6. An electrode holder comprising a body member having an internal recess whereat an internal surface portion of the body member is inclined toward the axis of an electrode adapted to be held by the holder, a shoe adapted to be disposed within the body member opposite said recess and lying against the electrode and wedge means adapted to enter said recess and lie against said surface portion to transmit pressure between the body and shoe.

7. An electrode holder comprising a body member, a shoe adapted to be positioned within the body member and to lie in contact with an electrode to be held by the holder and clamping means adapted to transmit pressure between the shoe and body member, the shoe having a portion extending outwardly and overlying the body member.

8. An electrode holder comprising a body member, a shoe adapted to be positioned within the body member and to lie in contact with an electrode to be held by the holder, the shoe and body member having interfitting portions restraining the shoe against substantial movement relatively to the body member in a direction parallel to the axis of the electrode, and clamping means adapted to transmit pressure between the shoe and body member.

9. An electrode holder comprising a body member, a shoe adapted to be positioned within the body member and to lie in contact with an electrode to be held by the holder, the shoe having a generally outwardly extending portion extending over and engaging the body member and having a clamping means receiving opening extending therethrough generally parallel to the axis of the electrode, and clamping means adapted to extend into said opening and transmit pressure between the shoe and the body member.

10. An electrode holder comprising a body member, a shoe adapted to be positioned within the body member and to lie in contact with an electrode to be held by the holder, clamping means adapted to transmit pressure between the shoe and body member, the shoe being adapted to be retracted away from the electrode upon loosening or removal of the clamping means, and means separate from the clamping means for holding the shoe in retracted position.

11. An electrode holder comprising a body member, a shoe adapted to be positioned within the body member and to lie in contact with an electrode to be held by the holder, clamping means adapted to transmit pressure between the shoe and body member, the shoe being adapted to be retracted away from the electrode upon loosening or removal of the clamping means, and latch means carried by one of the shoe and body member adapted for cooperation with the other thereof to hold the shoe in retracted position.

12. A wedge having a substantially smooth face and another face intersecting said substantially smooth face at the point of the wedge, said second mentioned face having two parallel rows of teeth extending longitudinally of the wedge with the teeth in one row staggered relatively to those in the other row.

FRANK W. BROOKE.